N. A. DANIELS.
Machine for Sawing Trees.
No. 221,912.  Patented Nov. 25, 1879.
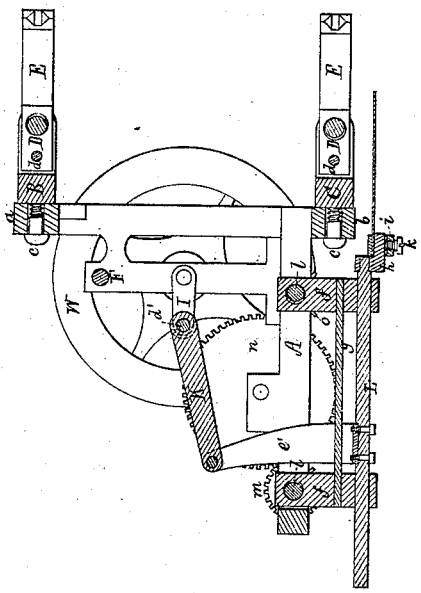
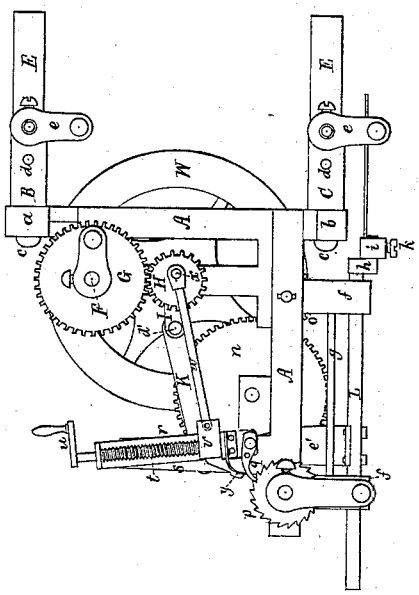
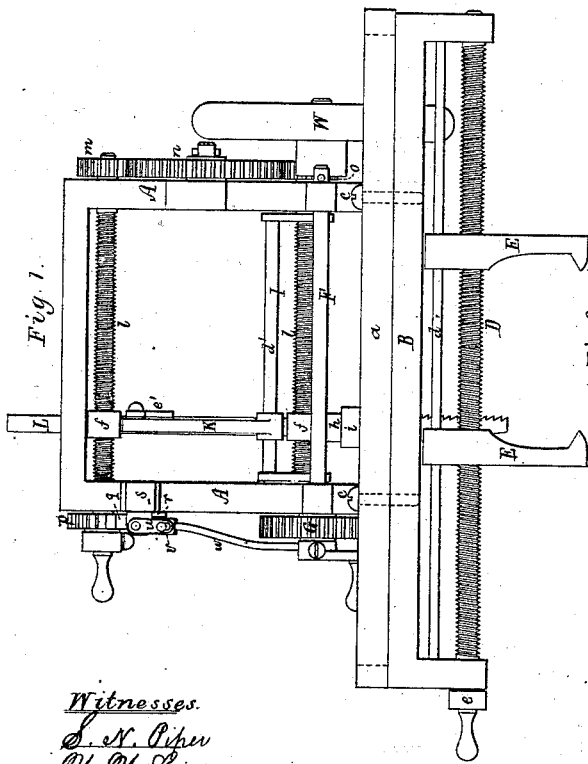
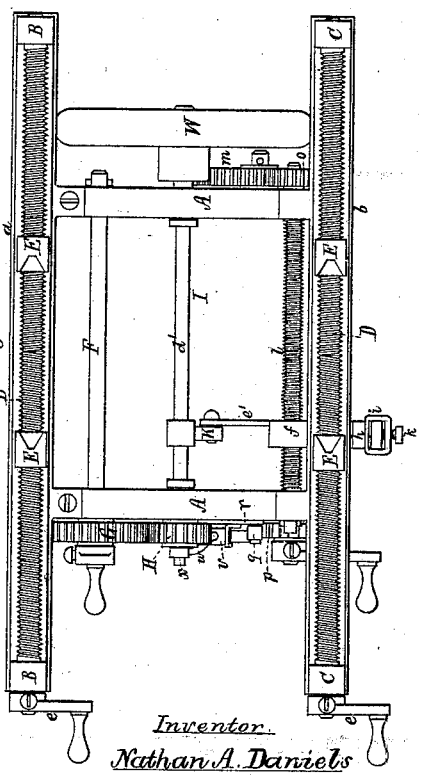
Witnesses.
J. N. Piper
N. W. Ling
Inventor.
Nathan A. Daniels
by attorney
R. H. Eddy

UNITED STATES PATENT OFFICE.

NATHAN A. DANIELS, OF FRANKLIN, MASSACHUSETTS.

IMPROVEMENT IN MACHINES FOR SAWING TREES.

Specification forming part of Letters Patent No. 221,912, dated November 25, 1879; application filed September 25, 1879.

*To all whom it may concern:*

Be it known that I, NATHAN A. DANIELS, of Franklin, of the county of Norfolk and State of Massachusetts, have invented a new and useful Improvement in Machines for Sawing Trees or Standing Timber; and I do hereby declare the same to be described in the following specification, and represented in the accompanying drawings, of which—

Figure 1 is a top view, Fig. 2 a front elevation, Fig. 3 an end view, and Fig. 4 a transverse section, of a machine containing my invention, the nature of which is defined in the claim or claims hereinafter presented.

The machine, as represented, is a combination of two adjustable cross-heads provided with mechanism for clamping them to a tree, with a sawing-machine consisting of a saw, mechanism for reciprocating it lengthwise, mechanism for feeding it laterally into the tree, and mechanism for varying such feeding of the saw.

In the drawings, A denotes the frame of the sawing-machine, it being provided with two horizontal and parallel rails, $a\, b$, one of which is arranged at the upper and the other at the lower part of the front of such frame, each of such rails being slotted lengthwise nearly from end to end of it to receive two clamp-screws, $c\, c$, for connecting to it one of the two cross-heads B C, as represented.

There is arranged in each of these cross-heads a long screw, D, which screws through a pair of clamps or jaws, E E, formed as shown, and adapted to slide upon a stationary rod, $d$, fixed in the cross-head parallel to the screw. A crank, $e$, fixed on each screw D, as shown, enables a person to revolve the screw, which from its middle to one of the ends of it has its screw-thread pitched in a direction opposite to that which extends from the middle to the opposite end of the said screw—that is to say, the thread on one side of the middle or half of the screw pitches to the right, while that on the other side of the middle or half of the screw pitches to the left, in consequence of which, when the screw is revolved in one direction, its two jaws will be caused simultaneously to approach each other, and in a like manner to recede from one another on the screw being revolved the opposite way.

The adjustable cross-heads are to enable the sawing-machine, after its saw may have cut a certain depth into a tree, and been moved back to a position to make a fresh cut, to be moved forward to carry the saw up to the termination or bottom of the kerf, in order that the saw, when next reciprocated lengthwise and fed forward laterally, may be caused to deepen the kerf or cut a farther distance into the tree.

Within the frame A is a driving-shaft, F, which is provided with a spur-gear, G, that engages with a pinion, H, fixed on one journal of a long bell-crank, I, arranged as represented. A connecting-rod, K, adapted to turn and slide on the wrist $d'$ of the said crank is pivoted to an arm, $e'$, extending up from a slide-rod, L, adapted to slide lengthwise in two hangers, $f\, f$, connected by a bar, $g$. To the front end of the rod L is fixed a shouldered head, $h$, to support a saw, such head being provided with an annular clamp, $i$, having in it one or more set-screws, $k$, for fixing the saw to the rod L. On the bell-crank being revolved a reciprocating rectilinear movement of the saw lengthwise of it will take place.

The hangers $f$ depend from two horizontal and parallel screws, $l\, l$, arranged in bearings in the frame A. These screws screw into and through the hangers, and are connected by a train of gears, $m\, n\, o$, so as to revolve at like speeds.

On one of the screws is fixed a ratchet-wheel, $p$, which engages with a pawl, $q$, pivoted to a vibratory arm, $r$, which, in turn, is pivoted to a post, $s$, so as to swing like a pendulum. This vibratory arm carries a long screw, $t$, provided with a crank, $u$, for revolving it. The said screw screws through a nut, $v$, pivoted or suitably attached to a connecting-rod, $w$, pivoted on a pin, $x$, projecting eccentrically from the side of the pinion H. On the pinion H being revolved a reciprocating or pendulous motion will be imparted to the arm $r$ to cause the pawl to reciprocate on and intermittently revolve the ratchet-wheel $p$, upon which it is pressed by a spring, $y$, arranged as shown.

The screw $t$ serves to raise and lower the nut of the connecting-rod in order to vary the vibratory movement of the arm $r$, and, consequently, the lateral feed of the saw caused by the feeding-screws $l\, l$ and the hangers moved thereby. A fly-wheel, W, is fixed on the other journal of the bell-crank.

Preparatory to using the machine, it, by means of its jaws, is to be clamped to the trunk of a tree or standing timber to be sawed by it. This having been done, the saw is to be moved up to the tree and reciprocated lengthwise and fed laterally so as to cut a kerf in the tree, after which the saw is to be set back and the frame of the machine is to be allowed to carry the saw to the bottom of the kerf, after which the saw is to be put in operation as before, in order to deepen the kerf. In this way the kerf may be extended a sufficient distance or through the tree, to enable it to be felled.

What I claim as my invention is as follows, viz:

1. The combination of the two adjustable cross-heads B C, provided with mechanisms, essentially as explained, for clamping them to a tree and to the sawing-machine frame A, with such frame and the saw-carrier L, the mechanisms, substantially as set forth, for imparting longitudinal and lateral motions to the saw-carrier, all as specified.

2. The combination of the two feeding-screws $l\ l$, their connecting train of gears $m\ n\ o$, and hangers $f f$, with the saw-carrier or sustaining-rod L, and with the arm $e'$, connecting-rod K, and bell-crank I, for reciprocating the said carrier longitudinally.

3. The combination of the hangers $f f$, the feeding-screws $l\ l$, and their connecting-gears $m\ n\ o$, the ratchet-wheel $p$, the pawl $q$, pendulous arm $r$, adjusting-screw $t$, nut $v$, connection-rod $w$, and crank or pin $x$, applied to the gear H of the bell-crank, all being arranged and to operate substantially as set forth.

NATHAN A. DANIELS.

Witnesses:
R. H. EDDY,
W. W. LUNT.